J. F. SCHERER.
EDUCATIONAL APPLIANCE.
APPLICATION FILED OCT. 9, 1917.
1,262,269.
Patented Apr. 9, 1918.
2 SHEETS—SHEET 1.
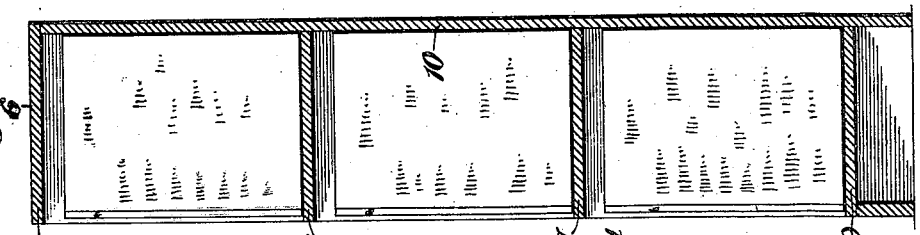
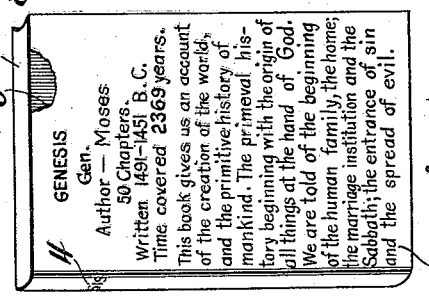
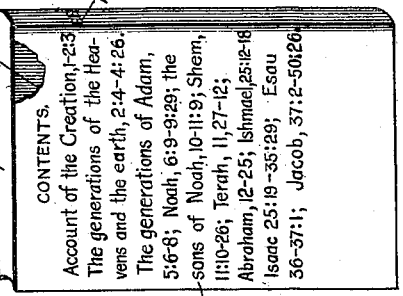
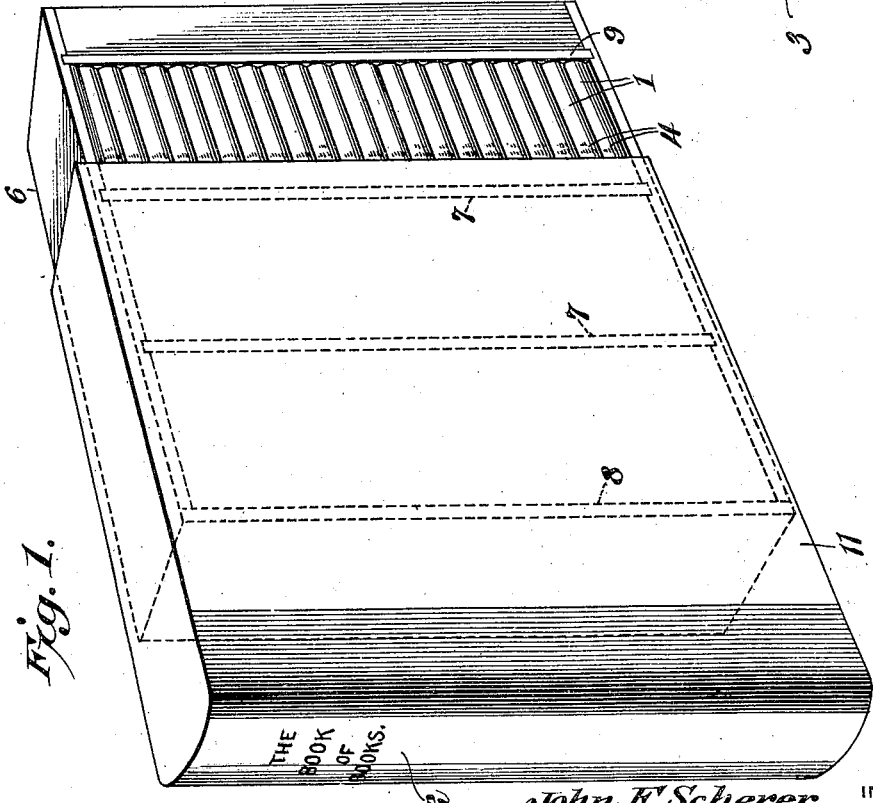
WITNESSES
Howard D. Orr
F. T. Chapman
John F. Scherer, INVENTOR,
BY
ATTORNEY

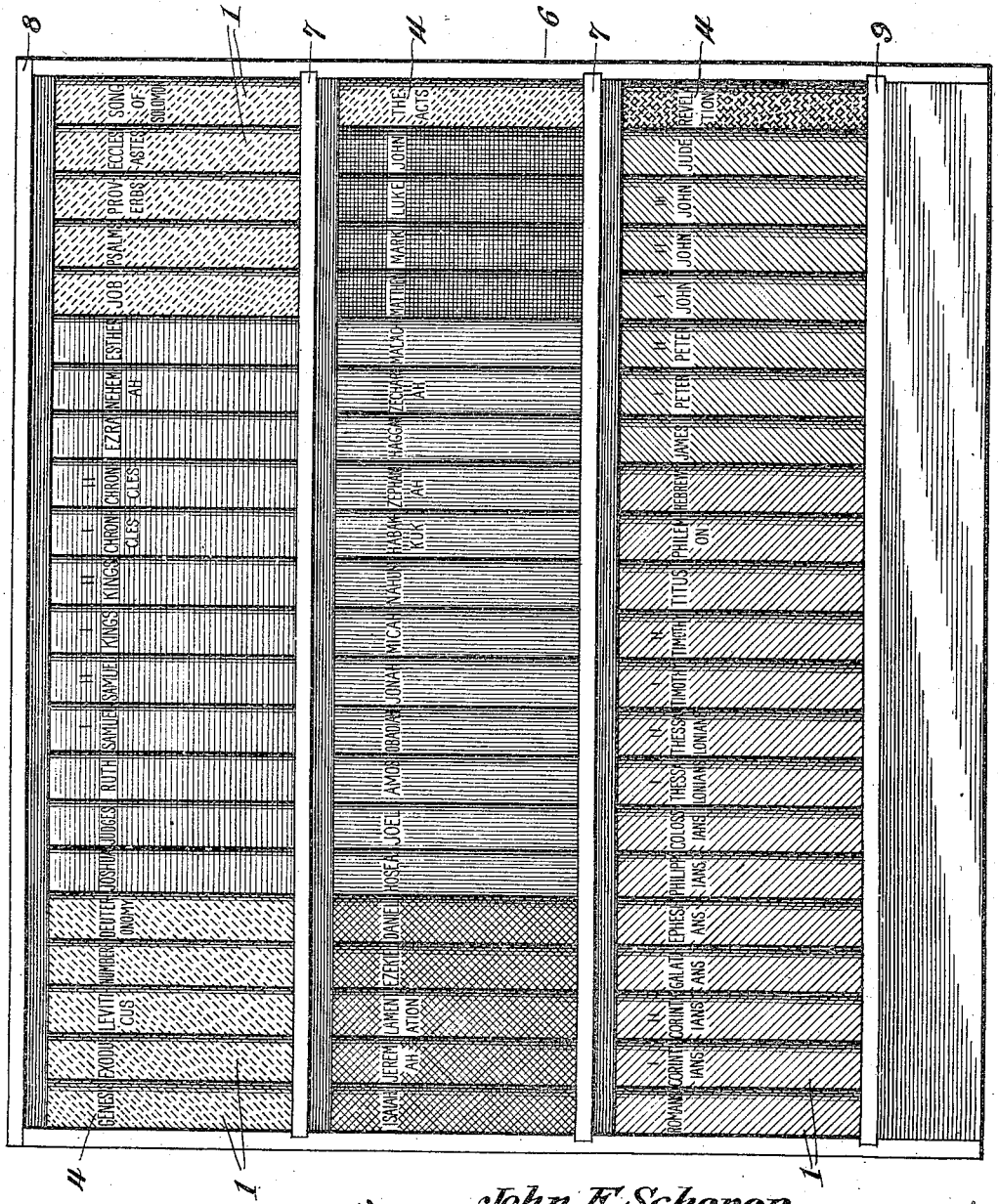

UNITED STATES PATENT OFFICE.

JOHN F. SCHERER, OF ENDEAVOR, PENNSYLVANIA.

EDUCATIONAL APPLIANCE.

1,262,269. Specification of Letters Patent. Patented Apr. 9, 1918.

Application filed October 9, 1917. Serial No. 195,570.

*To all whom it may concern:*

Be it known that I, JOHN F. SCHERER, a citizen of the United States, residing at Endeavor, in the county of Forest and State of Pennsylvania, have invented a new and useful Educational Appliance, of which the following is a specification.

This invention has reference to educational appliances, and its object is to facilitate the teaching of features of the Bible to persons of various ages, including the young, and to enhance the teaching value by providing the material employed in convenient and attractive form.

In accordance with the invention, miniature simulations of books in the form of blocks are provided, with the blocks covered with paper upon which suitable information is printed, the blocks themselves being conveniently formed of wood, although the invention is not confined to the use of wood and paper for the purposes named.

Each block is in general conformation like the others, but the information on the blocks is individualized to the various so-called books of the Bible.

There is also provided a holder in the form of miniature book shelves capable of standing upright upon a mantel shelf or table, and an enveloping member or cover is also provided of a size to completely hold the book shelves or book case and then simulate a bound volume whereby the book case with the blocks therein is protected and loss of the blocks is prevented, while the complete device may readily take the place of a book of like size in a full-sized bookcase.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified so long as such changes and modifications come within the scope of the appended claims.

In the drawings:

Figure 1 is a perspective view of the appliance with the book shelves partly withdrawn from the casing;

Fig. 2 is a face view of the book shelves with the blocks therein, but with the cover member omitted;

Fig. 3 is a vertical front to rear section of the structure shown in Fig. 2;

Figs. 4 and 5 are perspective views from respectively opposite sides of one of the blocks representing a book of the Bible.

In accordance with the invention, there are provided 66 blocks 1, each having imprints 2 and 3 on opposite faces and a title 4 on what, considering the block as a book, constitutes the back of the book. Each block 1 is shaped in simulation of a bound book, and may conveniently be made of wood, while the imprinted portion has a covering 5 of paper upon which the imprinting is produced. It is not necessary that such particular materials or arrangement of materials be employed, the feature of the invention being that each block shall simulate a book and contain upon its exterior certain information.

Since there are 66 so-called books in the Bible the invention contemplates the use of 66 blocks of like conformation but each differing from the others in the information imprinted thereon, and the blocks are further differentiated by coloring, for a purpose to be described.

Because of the relatively large number of separate blocks needed and in order to minimize the bulk of the device, the blocks are made of comparatively small size. Actual practice has demonstrated that with the blocks about 2¾ inches long, 2 inches wide, and ½ inch thick, they may be grouped into a small bookcase or book shelves 6, convenient for handling, and adapted to be placed upon a mantel or upon a table. Furthermore, since the number of books in the Bible divide into three groups of 22 books each, the book shelves are made with two shelves 7, a top 8, a base 9, and a back 10, the front of the miniature bookcase being open.

In order to protect the blocks or dummy books, there is provided a casing 11 of a size to snugly receive the book shelves, and simulating a book in appearance. The portion of the casing 11 corresponding to the back of a book, and indicated at 12, may be provided with an appropriate title such as "The Book of Books", which title is sometimes used to designate the Bible. This permits the whole device with the casing 11 to be located in a bookcase or on book shelves among other books.

It is customary to divide the total number of books of the Bible into various groups, as for instance, the first five books are customarily designated "The Books of Moses"; the next twelve books as "The Historical Books"; the next five books are called "The Poetical Books", etc. To differentiate the different groups into which the different books of the Bible are divided, they may be variously colored, a single color being used for each group, with the color of a group different from the colors of the other groups.

In Fig. 2 the differentiation of the groups is made manifest by appropriate lining, but it is to be understood that such lining may represent colors or other means of distinction.

The educational appliance is of a character which permits the dumping of the blocks from the book shelves or container onto a table or other support without harm thereto, and the blocks may be used by young children in the same manner as blocks are usually used by them. Again, the blocks, each of which contains the name of a book of the Bible may be used to teach both the names and the order of the books of the Bible and also the grouping of the books in accordance with the customary practice, such grouping being facilitated by a color or other appearance.

Each block is provided with information whereby certain data with respect to the book the block represents may be taught and other data giving an outline of the contents of the book. In this way, the blocks may be employed for the amusement of young children and for teaching older children or even adults with respect to general and certain particular information relating to the Bible.

The invention also provides a ready means whereby certain information about the Bible may be ascertained by anyone desiring such information, and this without the necessity of hunting through a library. The portion of each block giving the contents of the book the block represents, serves as an index whereby it becomes comparatively easy to locate the portions of the Bible containing desired information.

In the commercial form of the invention, it is customary to provide a book or pamphlet of instructions in which may be repeated all the information contained upon the various blocks, and each scholar capable of reading may be supplied with such a book.

What is claimed is:

1. An educational appliance comprising a series of blocks each resembling a book in appearance, each block containing an appropriate title designating the book it is intended to represent, and each block also containing on its exterior information with respect to the book it represents.

2. An educational appliance comprising a series of blocks each resembling a book in external appearance with a title on the back, a table of contents on one face, and a brief description on the other face.

3. An educational appliance comprising a series of blocks in number corresponding to the books of the Bible, and said blocks each resembling a book in appearance, the blocks having appropriate titles on their backs, a table of contents on one face, and a brief description on the other face.

4. An educational appliance comprising a series of blocks in number corresponding to the books of the Bible, and said blocks each resembling a book in appearance, the blocks having appropriate titles on their backs, a table of contents on one face, and a brief description on the other face, and the blocks being assembled in groups, with each group of a characteristically different appearance from those of the other groups.

5. An educational appliance comprising a set of blocks in number corresponding to the books of the Bible and each block resembling a book in external appearance, said series of blocks being divided into groups differentiated by color, with each block having a title corresponding to a book of the Bible, and provided with a table of contents on one face and a synopsis of information relative to the book on the other face.

6. An educational appliance comprising a miniature bookcase, a series of blocks each resembling a miniature book in external appearance and adapted to the bookcase, and a receptacle conforming in shape to a book and of a size to house the bookcase with the books therein.

7. An educational appliance for imparting information with respect to the Bible comprising a series of blocks having the external appearance of books and corresponding in number to the books of the Bible, the blocks being characteristically differentiated and provided with titles in accordance with the names of the books of the Bible they represent, to permit the ready grouping of the blocks in serial order, with the grouping indicated by the characteristic differentiation.

8. An educational appliance for imparting information with respect to the Bible comprising a series of blocks each resembling a miniature book in size and shape, the blocks conforming in number to the books of the Bible and each having a title of a book of the Bible, information with respect to the book, and a table of contents, all forming permanent parts of the block.

9. An educational appliance for imparting information with respect to the Bible comprising a series of blocks each resembling a miniature book in size and shape, the blocks conforming in number to the books of the Bible and each having a title of a book of the Bible, information with respect to the book, and a table of contents, all forming permanent parts of the block, said appliance also including a miniature bookcase of a size and shape to receive all the blocks, and a receptacle of a size and shape to house the bookcase with the blocks therein and in turn conforming in appearance to a book.

In testimony that I claim the foregoing as my own I have hereto affixed my signature in the presence of two witnesses.

JOHN F. SCHERER.

Witnesses:
 REGINALD R. CHAFFEE,
 WALTER J. PHILLIPS.

Copies of this patent may be obtained for five cents each, by addressing the "Commissioner of Patents, Washington, D. C."